March 5, 1940.  O. WERTHER  2,192,657
VEHICLE HEATING APPARATUS
Filed June 12, 1937  2 Sheets-Sheet 1

INVENTOR.
ODIN WERTHER
BY
ATTORNEYS

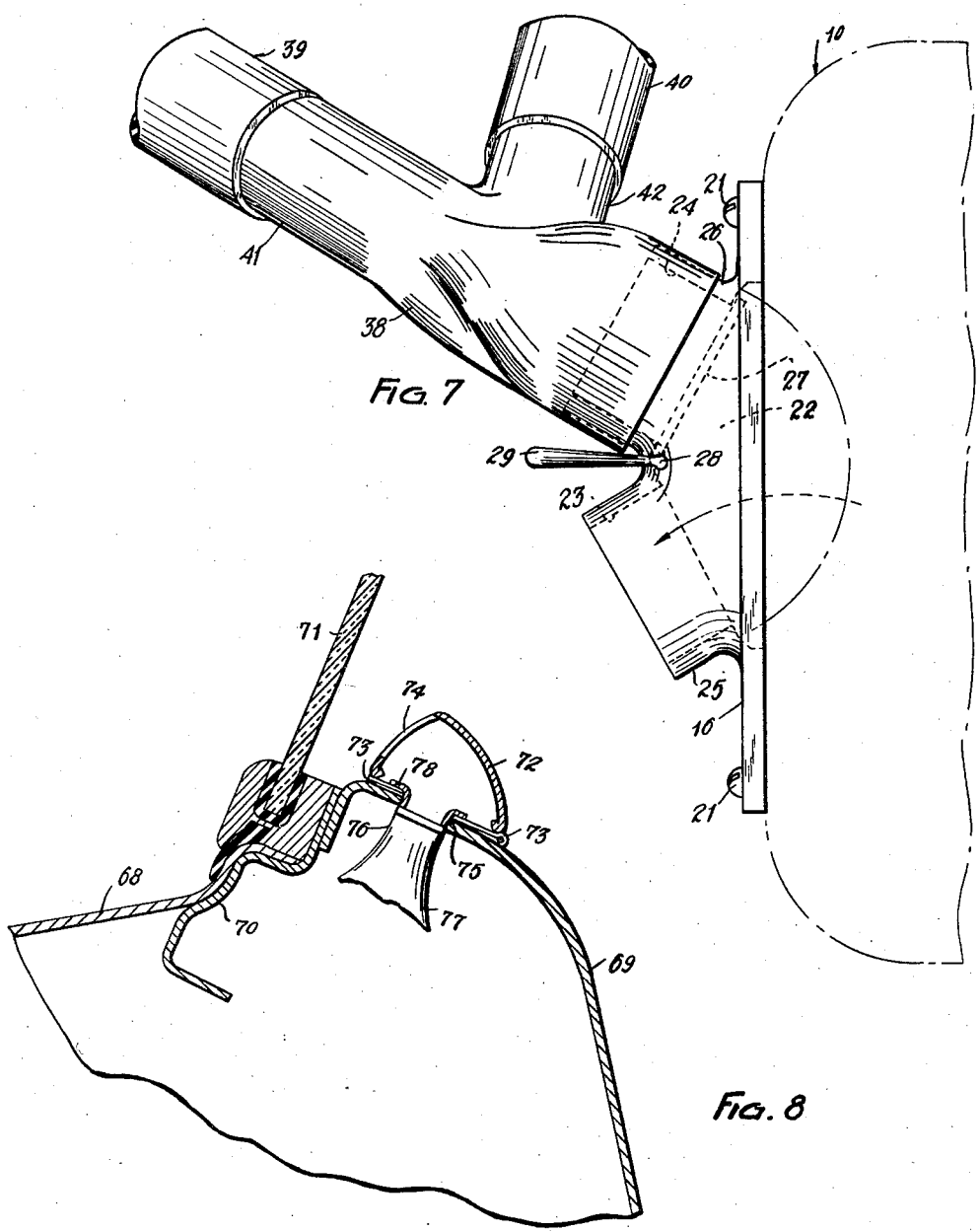

Patented Mar. 5, 1940

2,192,657

UNITED STATES PATENT OFFICE 2,192,657

VEHICLE HEATING APPARATUS

Odin Werther, Cleveland, Ohio, assignor to Eaton Manufacturing Company, Cleveland, Ohio, a corporation of Ohio Application June 12, 1937, Serial No. 147,905

4 Claims. (Cl. 20—40.5)

This invention relates to vehicle heating apparatus and, more particularly, to apparatus of this kind embodying a main heater and an auxiliary or attachment means for clearing or defrosting the windshield of the vehicle.

An object of my invention is to provide improved vehicle heating apparatus of this type which is of simplified construction and in which the delivery of an adequate volume of heated air against the windshield for defrosting purposes is assured.

Another object of my invention is to provide improved defrosting apparatus, adapted for universal application to different makes of vehicles, which can be readily and quickly installed without need for fastening screws or drilling or cutting operations which would mar the interior structure and finish of the vehicle, and without requiring the vehicle to be withdrawn from service for more than a relatively short period of time.

Other objects and advantages of my invention will be apparent from the following description when taken in conjunction with the accompanying sheets of drawings, in which Fig. 1 is an interior elevational view looking toward the windshield and instrument panel of a vehicle equipped with my heating apparatus;

Fig. 7 is a partial front elevation illustrating the connection of the defrosting attachment with the heater, and Fig. 8 is a partial longitudinal sectional view showing my defrosting attachment applied to a vehicle having a different type of windshield and instrument panel construction.

More detailed reference will now be made to the accompanying drawings in which I have illustrated preferred arrangements of my vehicle heating and windshield defrosting apparatus, but before proceeding with such detailed description I desire it to be understood that the drawings are to be regarded as illustrative and that my invention may be embodied in various other arrangements and heating apparatus.

Figure 2:
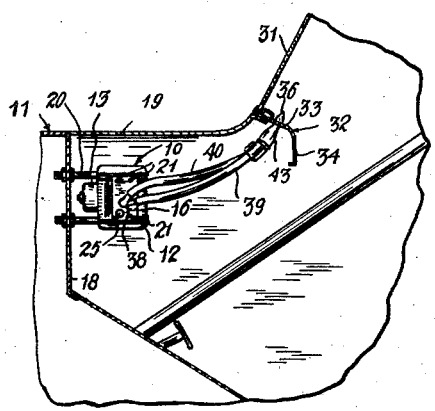
Fig. 2 is a partial longitudinal sectional view taken through the vehicle as indicated by line 2—2 of Fig. 1.
Figure 1:
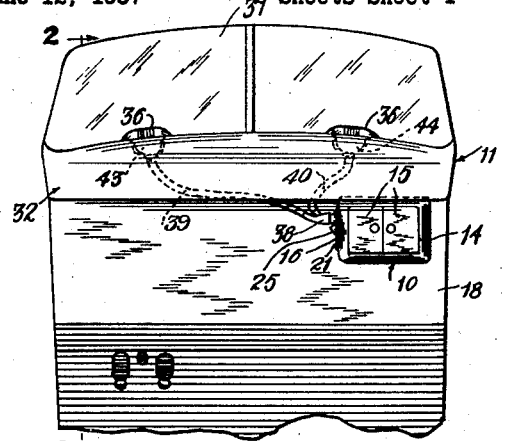

In Figs. 1 and 2 of the drawings, which illustrate the preferred general arrangement of my vehicle heating apparatus, I show a heater 10 which may be a heater of the hot-water type located in the front or driving compartment of the vehicle 11. This heater may be of a conventional construction, that is, it may have a housing 12 containing a heat exchanger or core and a fan driven by an electric motor 13 for forcing air through the core and out through the discharge openings of the heater housing. The housing of the heater shown in this instance is provided with a front or main discharge opening 14 which is adapted to be closed or partially closed by a pair of hinged doors 15 and also has an auxiliary discharge connection in the form of a plate attachment 16 which forms a part of my windshield defrosting apparatus.

In the case of a vehicle having a conventional left-hand drive, as is represented in Figs. 1 and 2 of the drawings, I mount the heater 10 on the right-hand side of the driving compartment, or in other words, at the side of the compartment opposite that at which the driver's station is located. I find that this location for the heater simplifies the connections and the installing of the defrosting device and also makes it feasible to discharge heated air toward the feet of the driver from the left end of the heater housing. The heater may be supported from the vehicle structure in any suitable manner, for example, it may be mounted on the dashboard 18 beneath the cowl 19 by means of its pipe extensions 20 through which the hot water or other heating medium is circulated through the core.

The plate attachment 16 (see Fig. 7) may be connected to the left end of the heater housing by means of suitable screws 21 and, when so connected, forms a cover for an opening in the end wall of the heater housing. This plate attachment has a branching air discharge passage 22 formed therein which, at the inner face of the plate portion of the attachment, communicates with the interior of the heater housing so that a portion of the heated air being delivered by the heater will be discharged through this passage. Passages 23 and 24, which branch from the passage 22, are formed respectively in diverging tubular extensions 25 and 26 of the plate fitting. It will be seen from the drawings that the diverging extensions 25 and 26 are so formed that the extension 26 extends laterally and upwardly toward the left and the extension 25 extends downwardly and laterally in the general direction of the feet of the driver of the vehicle. The extension 26 serves as a connection for the conduit means of the defrosting apparatus. A conduit may, if desired, also be connected to the extension 25, but I prefer to install and use the heating apparatus without such additional conduit and with the extension 25 uncovered and serving to direct heated air in the general direction of the driver's feet.

The branch passages 23 and 24 of the plate attachment 16 may be controlled by suitable means such as the valve 27 illustrated in this instance. This valve is mounted in the passage of the plate attachment to swing about a pivot axis 28. By means of a lever 29 the valve 27 may be swung from its dotted line position closing the passage 24, to a similar position closing the passage 23. In swinging from one position to the other, the valve may project beyond the inner face of the plate portion of the attachment 16 and swing through a portion of the air space within the heater housing. It will thus be seen that by means of this valve the discharge of heated air through the passage 24 for defrosting purposes can be shut off while the passage 23 is left open for a discharge of heated air into the driving compartment, or, on the other hand, if a supply of heated air to the defrosting apparatus is required, the valve 27 may be moved to an intermediate position and if the air then being supplied to the defrosting apparatus is found to be inadequate, the valve may be moved to close the passage 23 whereupon all of the heated air delivered through the plate attachment 16 will pass to the defrosting apparatus. The supply of heated air to the defrosting apparatus can be still further increased in volume by closing or partially closing the doors 15 of the main discharge opening.

Reverting to Figs. 1 and 2 of the drawings, it will be seen that the windshield 31 of the vehicle here illustrated is supported upon or adjacent the rear end of the cowl 19 and that an instrument panel 32 extends across the front compartment of the vehicle adjacent the base of the windshield. This instrument panel may comprise connected sections 33 and 34 which extend respectively rearwardly and downwardly with reference to the windshield.

Figure 3:
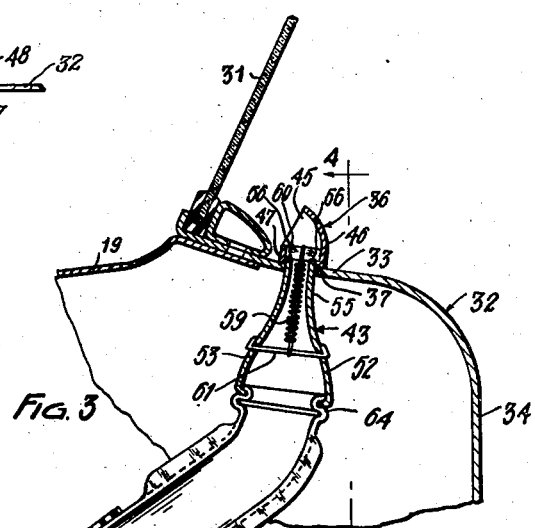
Fig. 3 is a partial longitudinal sectional view, on a larger scale, taken through the windshield and my novel defrosting device.
Figure 5:
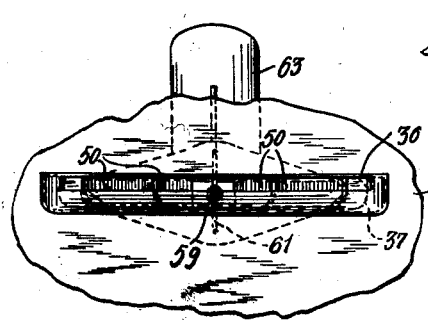
Fig. 5 is a plan view of the defroster.

For discharging heated air over various portions of the windshield for the above-mentioned clearing or defrosting purpose, I provide a pair of laterally spaced deflectors or distributors 36 which, as best seen in Figs. 1 and 3 of the drawings, are seated on the rearwardly extending section 33 of the instrument panel adjacent the base of the windshield 31. The deflectors 36 are disposed over slot-like openings 37 which are formed through the instrument panel and elongated in the direction of the windshield. The deflectors register substantially with the slot-like openings and serve to direct against the inner surface of the windshield heated air which is supplied by conduit means leading from the plate attachment 16 of the heater to the openings of the panel. This conduit means may include a Y-fitting 38 mounted on the extension 26 of the plate attachment 16 and conduit sections 39 and 40 which connect the arms 41 and 42 of the Y-fitting with air supply nozzles 43 and 44. These nozzles are located beneath, and concealed by, the instrument panel and are supported substantially in alignment with the deflectors 36.

Each of the deflectors 36 may be a hollow body, formed of cast metal or other suitable material, which is of a length and width such that the lower or inlet end of its passage 45 will register substantially with the slot-like opening 37 of the panel section 33. The deflector has front and rear walls 46 and 47 of which the rear wall is relatively short and the front wall is relatively longer and is curved toward the windshield 31. As will be seen from Figs. 1 and 4, the deflector is also curved convexly in the direction of its length and has end walls 48 of substantially the same height as the rear wall 47 and which conform to and follow the convex curvature of the body. A plurality of radiating vanes or ribs 50 divide the passage 45 of the deflector into a plurality of sections or passages. The air issuing from the deflector is controlled and directed by the end walls 48 and the radiating ribs 50 so that the air is distributed over various portions constituting a large section or area of the windshield.

Figure 4:
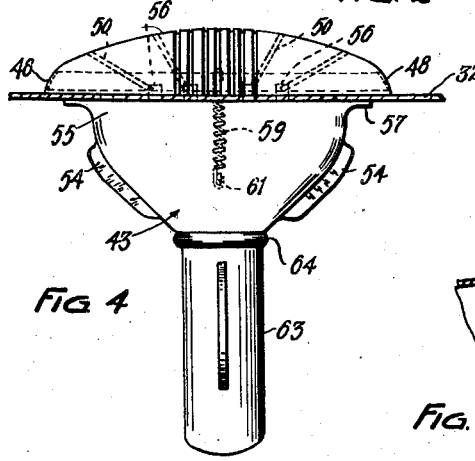
Fig. 4 is a partial sectional view taken through the instrument panel as indicated by line 4—4 of Fig. 3 and showing the defroster in front elevation.

The nozzle 43, which forms a part of the air supply conduit, may be a fitting formed from a pair of complemental sheet metal parts which may be connected together by having projecting flange portions 54 thereof spot-welded together. The parts 52 and 53 are so shaped that the nozzle formed thereby will have a laterally elongated generally flat discharge end 55 which is adapted to be presented to the slot-like opening 37 from the underside of the panel and to be connected with the deflector 36 so that the deflector and nozzle together form a substantially continuous air passage extending through the slot-like opening of the panel. The discharge end 55 of the nozzle 43 has a plurality of tooth-like lugs or ears 56 extending axially therefrom which project upwardly through the slot-like opening of the panel and into the inlet end of the passage of the deflector 36, as is shown in Figs. 3 and 4, for preventing lateral shifting of said nozzle and deflector relative to each other and relative to the panel opening. The discharge end of the nozzle may also be provided at its edges with laterally extending lugs or ears 57 which bear against the underside of the instrument panel when the nozzle is applied thereto.

One of the features of my invention consists in the novel connection provided between the nozzle 43 and the deflector 36. This connection facilitates and simplifies the installing of windshield defrosters, as will be presently explained. In this connection the deflector 36 seats on top of the panel over the slot-like opening 37 thereof and elastic means, preferably in the form of a tension spring 59, connects the nozzle 43 with the deflector. This tension spring also holds the deflector and nozzle respectively against the upper and lower faces of the panel with portions of the nozzle extending up through the panel opening and into the passage of the deflector. For connecting this spring with the deflector and nozzle I may provide these members, respectively, with a transverse rib and pin 60 and 61 with which the spring ends engage. As shown in Figs. 3 and 4, the spring 59 is disposed in the air supply passage of the defrosting device, but since this spring is of relatively small size, it does not materially restrict the flow of air.

The nozzle 43 may have a tubular extension 63 swiveled to the inlet end thereof for connection with the conduit section 39. This extension may also be formed of complemental sheet metal members welded together. The swivel connection 64 between the nozzle and the tubular extension may be formed by providing the sheet metal parts with cooperating flanges and grooves which are placed in interfitting engagement with each other prior to the welding of the sheet metal sections together.

Any suitable form of conduit may be used for the conduit sections 39 and 40 leading to the defrosting device, for example, these may be sections of flexible tubing of the type having rubber walls reinforced by fabric and spirally disposed wire.

Figure 6:
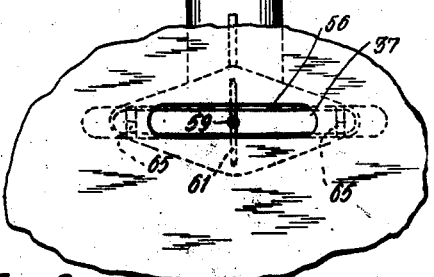
Fig. 6 is a similar plan view but with the air deflecting member of the defroster removed.

In present day automotive construction it is the practice to provide the instrument panel 32 with the laterally spaced slot-like openings 37 adjacent the base of the windshield. However, in different makes of vehicles these openings are of different length and in order that my deflector 36 and nozzle 43 may be used universally on all makes of automobiles, I construct these members of a length suitable for panel openings of the maximum length to be found in any of the automobiles being manufactured. This being the case, it will be found that the nozzle 43 will in some instances be longer than the slot 37, as in the arrangement illustrated in Fig. 6, in which case certain of the ears 56 lying outwardly of the edges of the panel opening must be cut off or bent over as indicated at 65.

When my novel defrosting device is to be applied to an automobile having the previously formed panel openings 37 therein, it is only necessary to mount the plate attachment 16 on the left hand end of the housing of the heater and to attach the Y-fitting 38, the conduit sections 39 and 40, and the nozzles 43 and 44 as illustrated in the drawings. By means of a cord or wire dropped through the panel openings and attached to the nozzles 43 and 44, these members can be lifted up into engagement with the underside of the panel with the discharge ends of the nozzles registering with the panel openings. The deflectors 36 can then be slid over the lifting wire or cord and seated in position on top of the panel over the opening thereof and the tension spring 59 connected therewith to retain the members in the desired connected relation. It will be seen from this brief description of the assembling operation, that it is not necessary to drill or cut any of the interior structure of the vehicle and therefore the heating and defrosting apparatus can be readily installed without scratching or otherwise marring the finish of the vehicle, and without need of the vehicle being taken out of service for longer than a relatively short period of time.

In some makes of automobiles, it will be found that the construction adjacent the windshield is somewhat different from that illustrated in Figs. 1, 2, and 3, but my heating and defrosting equipment can nevertheless be readily applied to such different construction, as will be seen from Fig. 8 of the drawings. In the automobile construction illustrated in Fig. 8, the cowl panel 68 and the instrument panel 69 connect with a transverse structural member 70 and the windshield 71 is mounted over this structural member. In association with this vehicle structure, the car manufacturer provides a hollow molding 72 which is mounted on the instrument panel adjacent the base of the windshield with an anti-squeak packing 73 between the molding and the panel. This hollow molding is detachably connected with the instrument panel by suitable screws or the like and, at laterally spaced points corresponding substantially with the location of the deflectors 36 in Fig. 1, is provided with openings 74 through its front wall. At correspondingly spaced points the instrument panel 69 is provided with slot-like openings 75 in which the discharge end 76 of a nozzle of similar construction to the nozzle 43 above described, is connected.

With the arrangement here illustrated, it will be seen that heated air delivered into the hollow molding 72 by the nozzles 77 will be discharged through the spaced openings 74 thereof against the windshield and, by reason of the relative location of these openings, the air will be distributed over various portions of a large section or area of the windshield.

When my defrosting device is to be applied to an automobile having the construction illustrated in Fig. 8, it is only necessary to remove the hollow molding 72 and cut an opening through the anti-squeak packing 73 to register with the opening 75 of the panel 69, if this has not already been done by the car manufacturer. Following this, the nozzle 77 is lifted up into engagement with the underside of the panel by means of a cord or wire as explained above, and the lugs or ears 78 of the nozzle which extend through the panel opening are bent over to retain the nozzle in the panel opening. It is then only necessary to replace the molding 72 which serves substantially the same purpose as the deflectors 36 of Fig. 1.

It will be seen from the foregoing description and accompanying drawings that I have provided improved automobile heating apparatus having defrosting equipment which is of simplified and attractive appearance and which can be very quickly installed. A further advantage results from my novel connection between the deflector and nozzle of the defrosting apparatus in that these members are securely held in place without the use of fastening screws and the air supply conduits can be suspended from the instrument panel and concealed thereby. It will also be seen that the supply of air to the defroster can be regulated by means of the valve 27 and can be further increased by closing or partially closing the doors 15 of the main discharge opening of the heater.

While I have illustrated and described my improved vehicle heating apparatus in a somewhat detailed manner, it should be understood that I do not wish to be limited to the precise details of construction or arrangements of parts herein disclosed, but regard my invention as including such changes and modifications as do not constitute a departure from the spirit of the invention and the scope of the appended claims.

Having thus described my invention, I claim:

1. In combination with a vehicle windshield and an adjacent panel having an opening therethrough, air supply and deflecting members on opposite sides of said panel and providing an air passage extending through said opening and elastic tension means connecting said members.

2. In combination, an automobile windshield, a panel adjacent the windshield and having an opening therethrough, air supply and distributing members on opposite sides of the panel and cooperating to form an air passage which extends through said opening, and a tension spring connecting said members.

3. In combination, an automobile windshield, a panel adjacent the windshield and having an opening therethrough, air supply and distributing members on opposite sides of the panel and cooperating to form an air passage which extends through said opening, and a tension spring extending through said opening and holding said members in connected relation with each other and against opposite sides of the panel.

4. In combination, an automobile windshield, a panel adjacent the base of the windshield and having an opening therethrough, an air supply conduit member having its discharge end presented to said opening from the underside of the panel, a hollow member seated on top of the panel over said opening to receive air from said conduit member and direct the same against the windshield, and a tension spring connecting said hollow member and conduit member and acting to draw said members against the panel, one of said members having portions thereof projecting into the panel opening for preventing relative lateral shifting of said members.

ODIN WERTHER.